United States Patent
Nelson et al.

(10) Patent No.: US 9,412,109 B2
(45) Date of Patent: Aug. 9, 2016

(54) ANALYSIS OF CLUSTERING SOLUTIONS

(71) Applicant: Target Brands, Inc., Minneapolis, MN (US)

(72) Inventors: James Carl Nelson, Burnsville, MN (US); Raja Ranganathan, Eden Prairie, MN (US); Abhijit Sharma, Bangaluru (IN); Zachary George Sands, St. Paul, MN (US)

(73) Assignee: Target Brands, Inc., Minneapolis, MN (US)

(*) Notice: Subject to any disclaimer, the term of this patent is extended or adjusted under 35 U.S.C. 154(b) by 133 days.

(21) Appl. No.: 13/677,996

(22) Filed: Nov. 15, 2012

(65) Prior Publication Data

US 2014/0136537 A1 May 15, 2014

(51) Int. Cl.
- *G06F 7/00* (2006.01)
- *G06F 17/30* (2006.01)
- *G06Q 30/00* (2012.01)
- *G06Q 10/06* (2012.01)

(52) U.S. Cl.
CPC ............... *G06Q 30/00* (2013.01); *G06Q 10/06* (2013.01)

(58) Field of Classification Search
USPC .......................................................... 707/737
See application file for complete search history.

(56) References Cited

U.S. PATENT DOCUMENTS

| | | | |
|---|---|---|---|
| 2005/0240469 A1* | 10/2005 | Rose ............... | G06Q 10/0635 705/7.28 |
| 2008/0052302 A1 | 2/2008 | Dolley et al. | |
| 2008/0270363 A1* | 10/2008 | Hunt et al. ................. | 707/3 |
| 2008/0294996 A1 | 11/2008 | Hunt et al. | |
| 2009/0222311 A1* | 9/2009 | Cao et al. ................... | 705/8 |
| 2010/0318403 A1 | 12/2010 | Bottom | |

FOREIGN PATENT DOCUMENTS

CA 2473831 A1 6/2003

OTHER PUBLICATIONS

Phanse, Swati, "Store Clustering," EzineArticles, Retrieved from the internet on Jun. 27, 2012, <http://ezinearticles.com/?Store-Clustering&id=6672262>, 5 pgs.

"Store Cluster Analysis," Revionics Analytic Services, Retrieved from the internet on Jun. 27, 2012, <http://www.revionics.com/pdf/Revionics%20Store%20Cluster%20DSDC001.pdf>, 2 pgs.

(Continued)

*Primary Examiner* — Alex Gofman
*Assistant Examiner* — Muluemebet Gurmu
(74) *Attorney, Agent, or Firm* — Shumaker & Sieffert, P.A.

(57) ABSTRACT

A computing system determines incremental values associated with a plurality of clustering solutions. Each of the clustering solutions groups stores of a retailer into clusters in a different way. For each clustering solution in the plurality of clustering solutions, the incremental value associated with the clustering solution indicates a difference between an estimated revenue associated with the clustering solution and revenue associated with a baseline clustering solution. The computing system then determines, based on the incremental values associated with the plurality of clustering solutions, the appropriate number of clusters. The clustering solutions that group the stores into more or fewer clusters than the appropriate number of clusters tend to be associated with incremental values that are the same or lower than the clustering solutions that group the stores into the appropriate number of clusters.

14 Claims, 12 Drawing Sheets

(56) References Cited

OTHER PUBLICATIONS

Office Action from Canadian Patent Application No. 2,798,944, mailed Oct. 1, 2013 (6 pages).
Office Action from Canadian Patent Application No. 2,798,944, mailed Feb. 12, 2014 (6 pages).
Office Action from Canadian Patent Application No. 2,798,944, mailed May 23, 2013 (3 pages).
Office Action from Canadian Patent Application No. 2,798,944, mailed Aug. 7, 2014 (8 pages).
Office Action from Canadian Patent Application No. 2,798,944, mailed Feb. 3, 2015 (11 pages).
Revionics, Press Release, "Revionics Launches New Optimization Services for Retailers" (Sacramento: Sep. 15, 2008), online: Revionics Development <http://revionics.com/index.php?option=com_content&lang=en&month=9&review=archive&year=2008> [Revionics] (3 pages).
"SAS Intelligent Clustering for Retail" (SAS Institute, 2010), archived online: SAS Institute <http://web.archive.org/web/20120916182632/http://www/sas.com/resources/factsheet/sas-intelligent-clustering-for-retail-fact-sheet.pdf> [SAS] (4 pages).

* cited by examiner

ANALYSIS OF CLUSTERING SOLUTIONS

BACKGROUND

Retailers include entities that sell merchandise. In some examples, a retailer is a business that retails general merchandise to consumers. Furthermore, in some examples, a retailer is a business that wholesales merchandise to other businesses.

A retailer may have many stores. Each of the stores is a physical facility at which the retailer sells merchandise. For various reasons, the retailer stocks different merchandise in different ones of its stores. For example, the retailer stocks more winter clothing in northern stores than in southern stores. In another example, the retailer stocks different types of merchandise in different stores based on the demographics of people living near the stores.

If the retailer has many stores, the retailer may group its stores into clusters. Each store in a cluster may stock a similar assortment of merchandise. Stores in different clusters may stock different assortments of merchandise. Grouping stores into clusters may help the retailer manage costs associated with stocking different assortments of merchandise at different stores, while at the same time improving sales by targeting particular assortments of merchandise to customers of stores belonging to the same cluster.

SUMMARY

In general, a computing system implements techniques for determining an appropriate number of clusters to use when grouping the stores of a retailer into clusters. To determine the appropriate number of clusters, the computing system determines incremental values associated with a plurality of clustering solutions. Each of the clustering solutions groups stores of a retailer into clusters in a different way. For each respective clustering solution in the plurality of clustering solutions, the incremental value associated with the respective clustering solution indicates a difference between an estimated revenue associated with the respective clustering solution and revenue associated with a baseline clustering solution. The computing system then determines, based on the incremental values associated with the plurality of clustering solutions, the appropriate number of clusters. The clustering solutions that group the stores into more or fewer clusters than the appropriate number of clusters tend to be associated with incremental values that are the same or lower than the clustering solutions that group the stores into the appropriate number of clusters.

In one example, this disclosure describes a method that comprises determining, by a computing system, incremental values associated with a plurality of clustering solutions. Each of the clustering solutions groups stores of a retailer into clusters in a different way. For each clustering solution in the plurality of clustering solutions, the incremental value associated with the clustering solution indicates a difference between an estimated revenue associated with the clustering solution and revenue associated with a baseline clustering solution. The method also comprises determining, by the computing system and based on the incremental values associated with the plurality of clustering solutions, an appropriate number of clusters into which to group the stores of the retailer. Clustering solutions that group the stores into more or fewer clusters than the appropriate number of clusters tend to be associated with incremental values that are the same or lower than clustering solutions that group the stores into the appropriate number of clusters.

In another example, this disclosure describes a computing system comprising one or more processors and one or more storage devices that store instructions that, when executed by the one or more processors, cause the computing system to determine incremental values associated with a plurality of clustering solutions. Each of the clustering solutions groups stores of a retailer into clusters in a different way. For each clustering solution in the plurality of clustering solutions, the incremental value associated with the clustering solution indicates a difference between an estimated revenue associated with the clustering solution and revenue associated with a baseline clustering solution. The instructions also cause the computing system to determine an optimal cluster count based on the incremental values associated with the plurality of clustering solutions. The optimal cluster count indicates a number of clusters into which the stores are grouped. Ones of the clustering solutions that do not have the optical cluster count have a tendency to be associated with incremental values that are the same or tower than ones of the clustering solutions that have the optical cluster count.

In another example, this disclosure describes a computer readable storage medium that stores instructions that, when executed by one or more processors of a computing system, cause the computing system to determine, based on incremental values associated with a plurality of clustering solutions, an appropriate number of clusters such that the incremental values associated with the clustering solutions having the appropriate number of clusters have a tendency to be greater than the incremental values associated with the clustering solutions that group the stores into more or fewer clusters than the appropriate number of clusters. Each of the clustering solutions groups stores of a retailer into clusters in a different way. For each clustering solution in the plurality of clustering solutions, the incremental value associated with the clustering solution indicates a difference between an estimated revenue associated with the clustering solution and revenue associated with a baseline clustering solution.

The details of one or more examples are set forth in the accompanying drawings and the description below. Other features, objects, and advantages will be apparent from the description, drawings, and claims.

DETAILED DESCRIPTION

Figure 1:
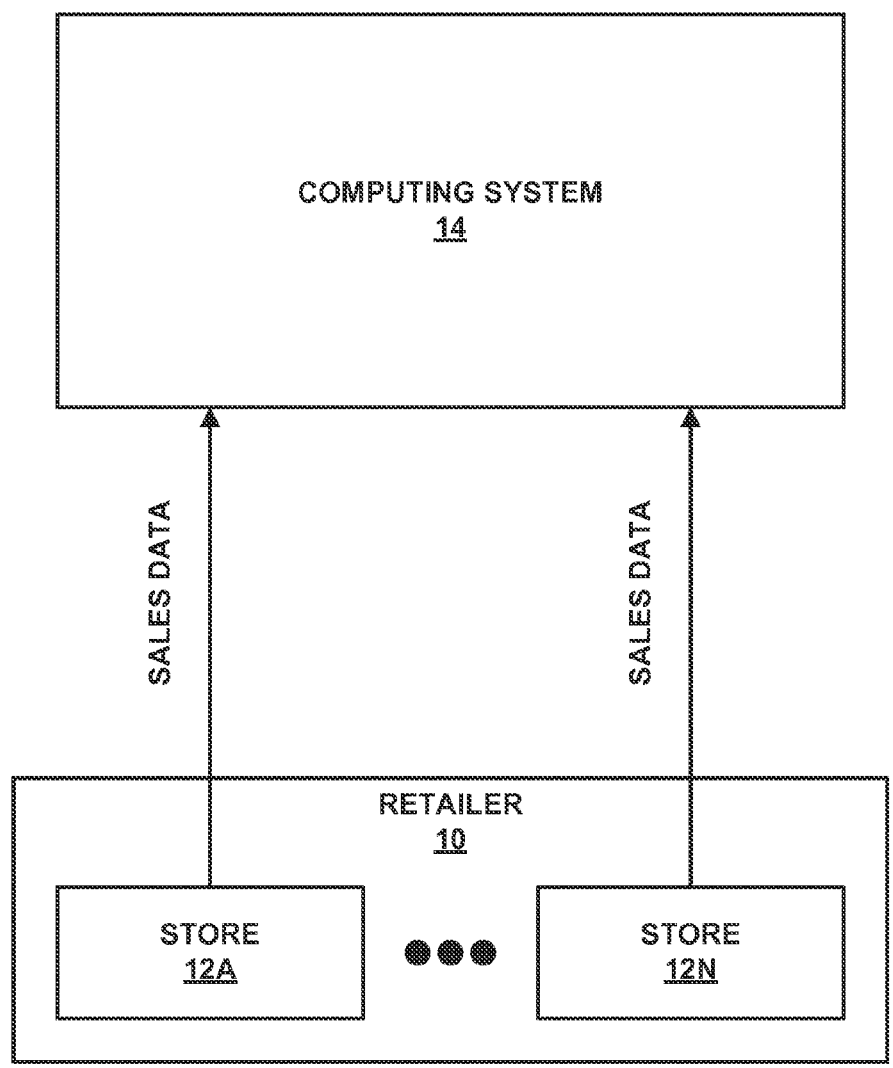
FIG. 1 is a conceptual diagram that illustrates an example environment in which one or more aspects of this disclosure is implemented.

FIG. 1 is a conceptual diagram that illustrates an example environment in which one or more aspects of this disclosure are implemented. As illustrated in the example of FIG. 1, a retailer 10 includes a plurality of stores 12A-12N (collectively, "stores 12"). Retailer 10 is an entity that sells merchandise. In some examples, retailer 10 is a business that retails general merchandise to consumers. In other examples, retailer 10 is a business that wholesales merchandise to other businesses.

Stores 12 are physical facilities at which retailer 10 sells merchandise. For instance, stores 12 may include standalone buildings, retail space within shopping complexes, and so on. Each of stores 12 has a plurality of aisles. Each of the aisles may have shelf and/or rack space for displaying merchandise. In some stores, at least some of the aisles have end caps for displaying additional merchandise. Each of stores 12 includes one or more checkout lanes with cash registers at which customers may purchase merchandise. In some examples, the checkout lanes may be staffed with cashiers.

Retailer 10 stocks different stores 12 with different assortments of merchandise. In other words, different stores 12 have different types and quantities of items available for sale. Stocking different stores 12 with different assortments of merchandise enables retailer 10 to better meet the specific demands and/or desires of customers of different stores 12 of the retailer. For instance, retailer 10 may select different assortments of merchandise for different stores based on various data regarding the locations, layouts, and customers of the stores.

Ideally, retailer 10 would stock each of stores 12 with the exact assortment of merchandise the store's customers want to buy. Thus, in an ideal situation, each of stores 12 would have a different assortment of merchandise. However, it may be impractical for retailer 10 to determine with exact precision the assortment of merchandise sought by the customers of each individual store at any given time. Moreover, it can be impractical, because of the large number of stores, for retailer 10 to manage the distribution of different assortments of merchandise to each of stores 12.

Accordingly, retailer 10 groups stores 12 into clusters. In general, stores 12 are not in more than one cluster at a time. In general, stores 12 in the same cluster stock the same assortment of merchandise while stores 12 in different clusters stock different assortments of merchandise. In other words, stores 12 in different clusters have different assortments of items available for sale. For example, stores 12 in a first cluster stocks additional cold weather clothing during winter while stores 12 in a second cluster stocks additional beachwear during winter. In another example, stores 12 in a first cluster stocks more items belonging to a first brand than a second brand while stores 12 in a second cluster stocks more items belonging to the second brand than the first brand.

Figure 2A:
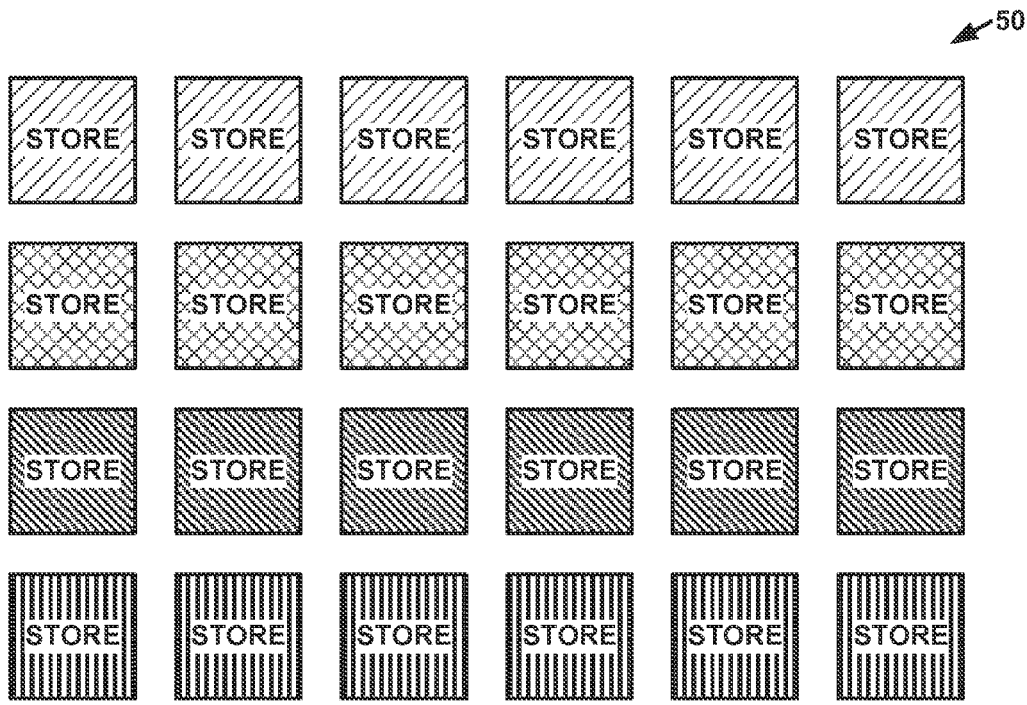
FIG. 2A is a conceptual diagram that illustrates a first example clustering solution.
Figure 2B:
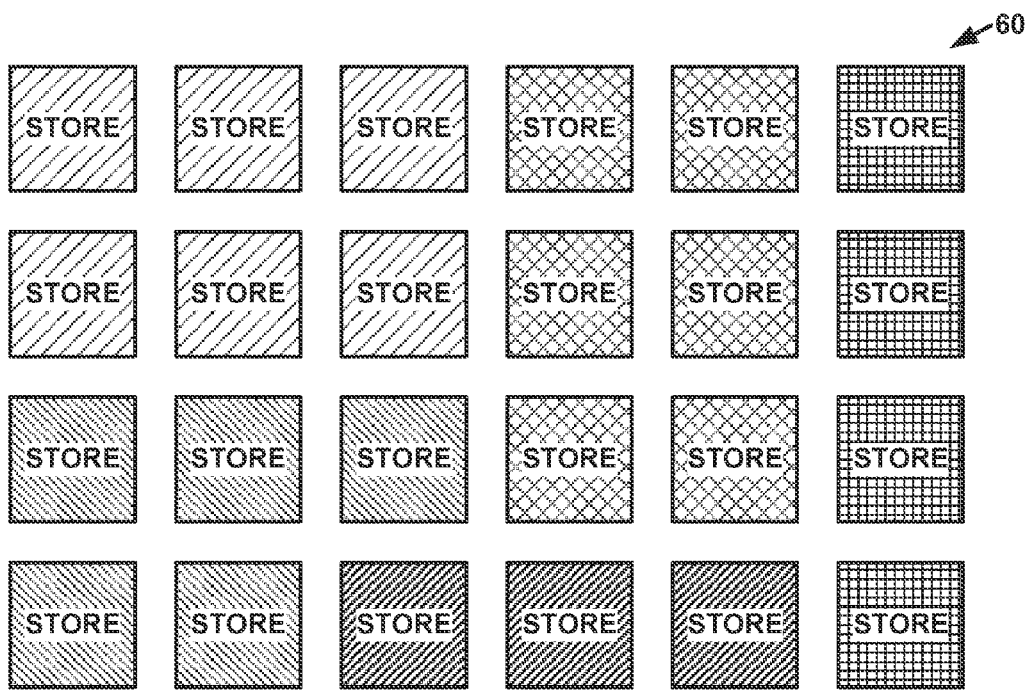
FIG. 2B is a conceptual diagram that illustrates a second example clustering solution.

Retailer 10 identifies multiple clustering solutions. Each of the clustering solutions groups stores 12 of retailer 10 into clusters in a different way. For example, retailer 10 may have eight stores, denoted "A" through "H". In this example, a first clustering solution groups stores "A" through "D" into a first cluster and stores "E" through "H" into a second cluster. Furthermore, in this example, a second clustering solution groups stores "A" and "B" into a first cluster, stores "C," "D," and "E" into a second cluster, and stores "F," "G," and "H" into a third cluster. A third clustering solution groups each of stores "A" through "H" into separate clusters. FIGS. 2A and 2B, described in greater detail below, are conceptual diagrams that illustrate example clustering solutions.

After identifying the clustering solutions, retailer 10 selects one of the clustering solutions and stock assortments of merchandise at stores 12 according to the selected clustering solution. When retailer 10 stocks assortments of merchandise at stores 12 according to the selected clustering solution, retailer 10 stocks assortments of merchandise at stores 12 such that stores 12 within clusters of the selected clustering solution have similar assortments of merchandise.

Retailer 10 attempts to select a clustering solution that has an appropriate number of clusters. The number of clusters in the selected clustering solution may have a significant effect on the net income of retailer 10. If the selected clustering solution has too few clusters, some of stores 12 may not be stocking the assortment of merchandise demanded by their customers. If a store does not stock the assortment of merchandise demanded by its customers, revenue from that store may not reach its full potential. Hence, if the selected clustering solution has too few clusters, the net income of retailer 10 may not reach its full potential because the revenue of retailer 10 has not reached its full potential. On the other hand, if the selected clustering solution has too many clusters, the costs of selecting assortments of merchandise for each of the clusters and distributing the selected assortments of merchandise to stores 12 in the clusters may increase faster than the incremental revenue obtained by grouping stores 12 into additional clusters. Hence, if the selected clustering solution has too many clusters, the increased cost of doing business may exceed any additional increases in revenue.

In accordance with the techniques of this disclosure, a computing system 14 receives sales data for stores 12. Computing system 14 then determines, based at least in part on the sales data for stores 12, incremental values associated with a plurality of clustering solutions. The incremental value associated with a clustering solution indicates a difference between an estimated amount of revenue associated with the clustering solution and revenue associated with a baseline clustering solution. The baseline clustering solution is a clustering solution that retailer 10 is currently using, with which retailer 10 has experience and for which retailer 10 has past sales data. In one example, the baseline clustering solution includes all of the stores into a single cluster such that all stores receive the same assortment of products. In another example, the baseline clustering solution includes clustering stores of retailer 10 into a relatively small number of different clusters based on some general characteristic of the store like the physical size of (e.g. square feet). Example processes for determining the incremental values associated with the clustering solutions are described elsewhere in this disclosure.

Figure 4:
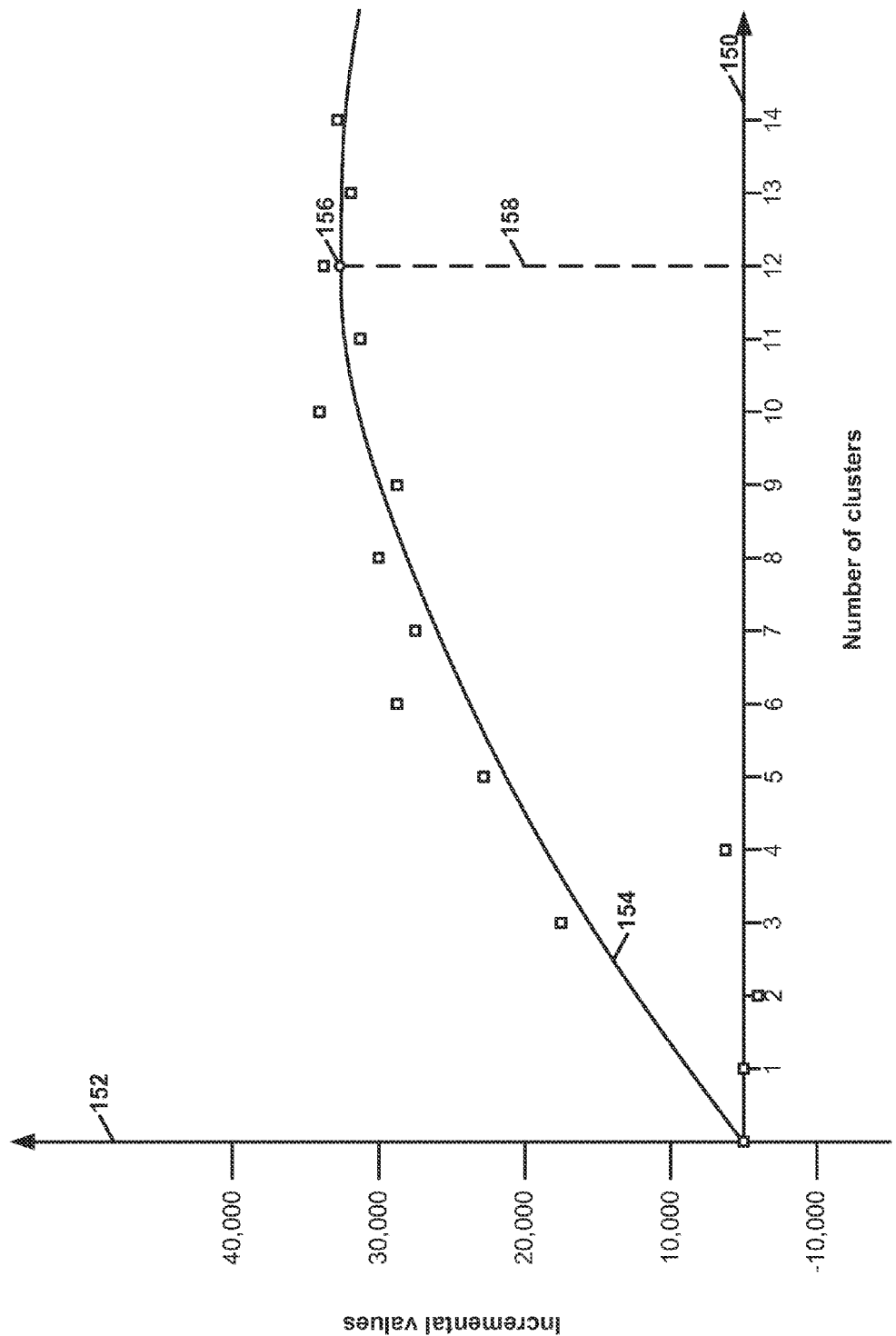
FIG. 4 is a conceptual diagram that illustrates an example chart on which points associated with clustering solutions are plotted.

After determining the incremental values associated with the clustering solutions, computing system 14 determines, based at least in part on the incremental values associated with the clustering solutions, an appropriate number of clusters. The appropriate number of clusters is also referred to herein as an optimal cluster count. Computing system 14 determines the appropriate number of clusters in various ways. In some examples, computing system 14 determines the appropriate number of clusters by plotting points on a graph for each of the clustering solutions. The graph has a first axis (e.g., a horizontal axis) that corresponds to a number of clusters and a second axis (e.g., a vertical axis) that corresponds to the incremental values associated with the clustering solutions. In some examples, computing system 14 determines a curve based on a polynomial regression over the points in the graph. In other examples, computing system 14 determines a best fit curve over the points in the graph. In this example, the appropriate number of clusters is equal to a number of clusters associated with a turning point (e.g., a maximum point) of the curve. FIG. 4, described in detail below, is a conceptual diagram that illustrates such a graph.

FIG. 2A is a conceptual diagram that illustrates an example clustering solution 50. In the example of FIG. 2A, each of the squares corresponds to one of stores 12. The cross-hatching in each of the squares indicates the cluster to which the corresponding store belongs. For instance, in the example of FIG. 2A, stores that correspond to squares in the top row belong to a first cluster, stores that correspond to squares in the second row belong to a second cluster, stores that correspond to squares in the third row belong to a third cluster, and stores that correspond to squares in the fourth row belong to a third cluster.

FIG. 2B is a conceptual diagram that illustrates an example clustering solution 60. As in FIG. 2A, each of the squares in FIG. 2B corresponds to one of stores 12 and the cross-hatching in each of the squares indicates the cluster to which the corresponding store belongs. However, clustering solution 60 groups the same stores in a different way than clustering solution 50.

Figure 3:
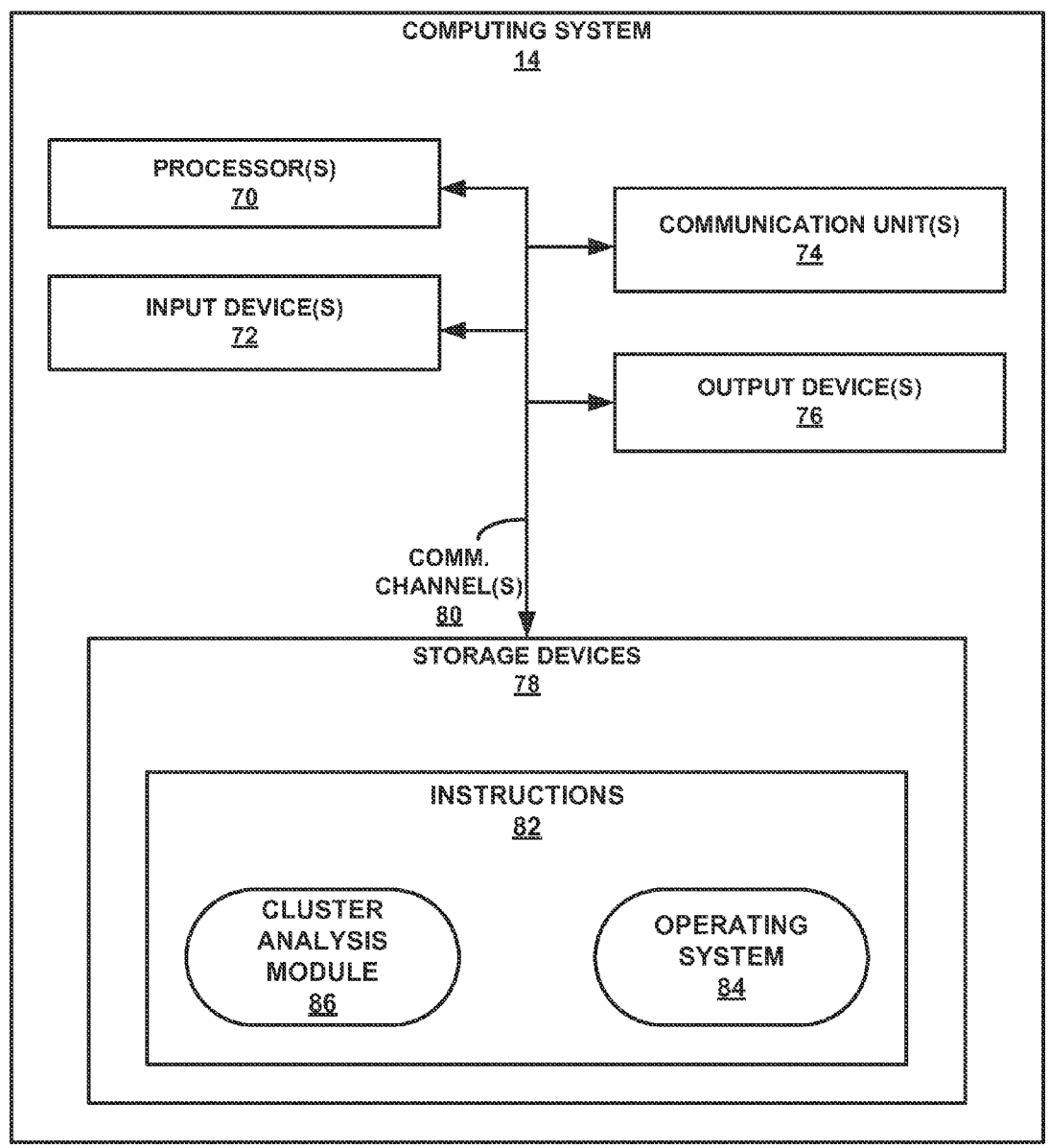
FIG. 3 is a block diagram that illustrates an example configuration of a computing system.

FIG. 3 is a block diagram that illustrates an example configuration of computing system 14. For purposes of illustration, FIG. 3 is described with reference to FIG. 1. FIG. 3 illustrates only one particular example of computing system 14, and many other example configurations of computing system 14 exist.

As shown in the example of FIG. 3, computing system 14 includes one or more processors 70, one or more input devices 72, one or more communication units 74, one or more output devices 76, one or more storage devices 78, and one or more communication channels 80. Computing system 14 may include many other components. For example, computing system 14 may include physical buttons, microphones, speakers, communication ports, and so on.

Communication channel(s) 80 interconnect each of the components 70, 72, 74, 76, and 78 for inter-component communications (physically, communicatively, and/or operatively). In some examples, communication channel(s) 80 include a system bus, a network connection, an inter-process communication data structure, or any other method for communicating data. In some examples, one or more of communication channel(s) 80 are implemented using a local area network (LAN) or a wide area network, such as the Internet.

Storage device(s) 78 within computing system 14 store information used during operation of computing system 14. In some examples, storage device(s) 78 have the primary purpose of being a short term and not a long-term computer-readable storage medium. In some such examples, storage device(s) 78 do not retain stored data if powered off. Examples of volatile memories include random access memories (RAM), dynamic random access memories (DRAM), static random access memories (SRAM), and other forms of volatile memories known in the art. In some examples, storage device(s) 78 are further configured for long-term storage of information as non-volatile memory and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories.

Computing system 14 is able to receive indications of user input from input device(s) 72. Examples of user input include tactile, audio, and video input. Example types of input device(s) 72 include presence-sensitive screens, touch-sensitive screens, mice, keyboards, voice responsive systems, video cameras, microphones, electronic pens, or other types of devices for detecting user input.

Communication unit(s) 74 enable computing system 14 to send data on and receive data from a communications network, such as a local area network or the Internet. In some examples, communication unit(s) 74 include wireless transmitters and receivers that enable computing system 14 to communicate wirelessly with the communications network.

Output device(s) 76 generate output. Examples types of output include tactile, audio, and video output. Example types of output device(s) 76 include presence-sensitive screens, sound cards, video graphics adapter cards, speakers, cathode ray tube (CRT) monitors, liquid crystal displays (LCD), or other types of devices for generating output.

Storage device(s) 78 store data, such as computer-executable instructions 82. Processor(s) 70 read instructions 82 from storage device(s) 78 and execute instructions 82. Execution of instructions 82 by processor(s) 70 configure or cause computing system 14 to provide at least some of the functionality ascribed in this disclosure to computing system 14. As shown in the example of FIG. 3, instructions 82 include an operating system 84. Execution of instructions in operating system 84 causes computing system 14 to perform various functions to manage hardware resources of computing system 14 and to provide various common services for other computer programs.

Furthermore, instructions 82 include a cluster analysis module 86. Execution of instructions in cluster analysis module 86 configures or causes computing system 14 to perform various aspects of this disclosure. For example, execution of instructions in cluster analysis module 86 causes computing system 14 to determine incremental values associated with a plurality of clustering solutions. In addition, execution of instructions in cluster analysis module 86 causes computing system 14 to determine, based on the incremental values associated with the plurality of clustering solutions, an appropriate number of clusters into which to group stores of retailer 10.

FIG. 4 is a conceptual diagram that illustrates an example chart on which points associated with clustering solutions are plotted. As illustrated in the example of FIG. 4, the chart has a horizontal axis 150 and a vertical axis 152. Horizontal axis 150 corresponds to the number of clusters in the clustering solutions. Vertical axis 152 corresponds to incremental values associated with clustering solutions. In the example of FIG. 4, small squares indicate clustering solutions. A curve 154 indicates a best fit curve through the points on the chart. A point 156 indicates a maximum point of curve 154. As indicated by line 158, point 156 corresponds to twelve clusters. Hence, in the example of FIG. 4, the appropriate number of clusters is equal to twelve.

Figure 5:
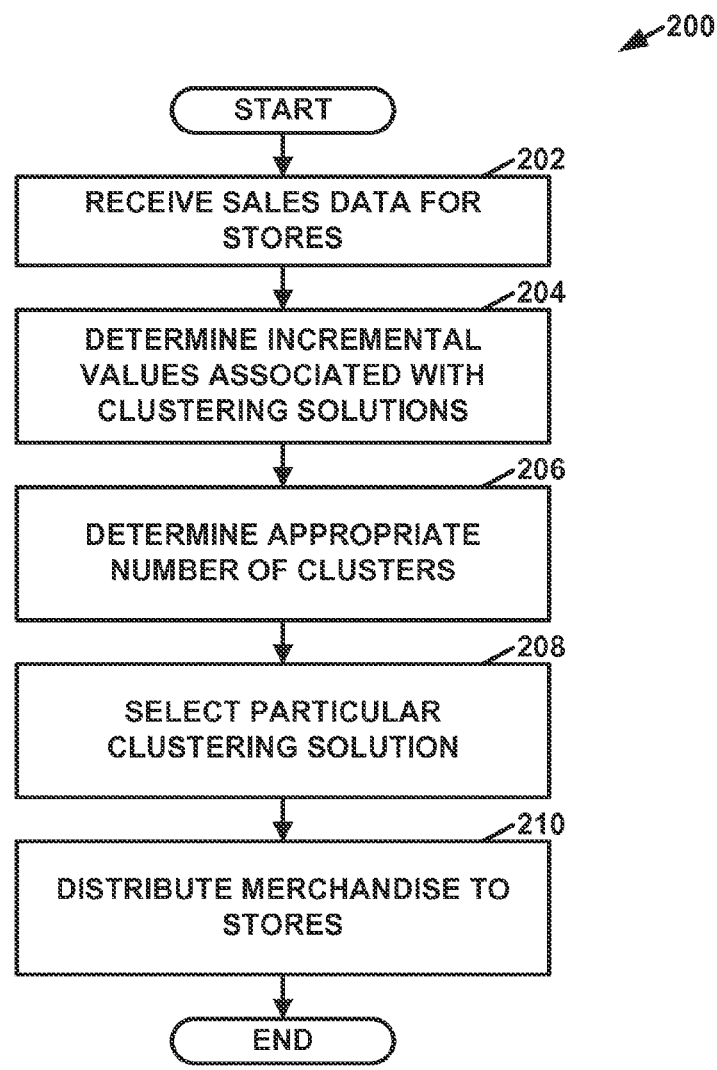
FIG. 5 is a flowchart illustrating an example operation of a computing system, in accordance with one or more aspects of this disclosure.

FIG. 5 is a flowchart illustrating an example operation 200 of computing system 14, in accordance with one or more aspects of this disclosure. For purposes of illustration, FIG. 5 and the other figures of this disclosure are described with reference to FIG. 1. However, FIG. 5 and the other figures of this disclosure are not limited to the example of FIG. 1. The example of FIG. 5 and the examples of the other figures of this disclosure illustrate only particular examples, and many other examples exist.

After computing system 14 starts operation 200, computing system 14 receives sales data for stores 12 (202). The sales data for a store include entries for brands associated with items (e.g., products) sold at the store. In some examples, a brand is a name or mark that identifies a set of items. For instance, types of diapers produced by different companies may be associated with different brands. An entry for a brand identifies the brand, a number of items associated with the brand, an amount of "spend" associated with the brand, and a number of individual units associated with the brand that were sold by the store. The amount of "spend" associated with the brand is the amount of revenue received by the store by selling items associated with the brand.

Computing system 14 receives the sales data for stores 12 in various ways. In some examples, each of stores 12 periodically (e.g., on an hourly or daily basis) sends data regarding their sales to computing system 14. Computing system 14 stores the sales data in a database for later retrieval. In another example, stores 12 stores sales data at computing systems physically located at stores 12. In this example, computing system 14 may periodically request the sales data from the computing systems at stores 12.

Figure 6:
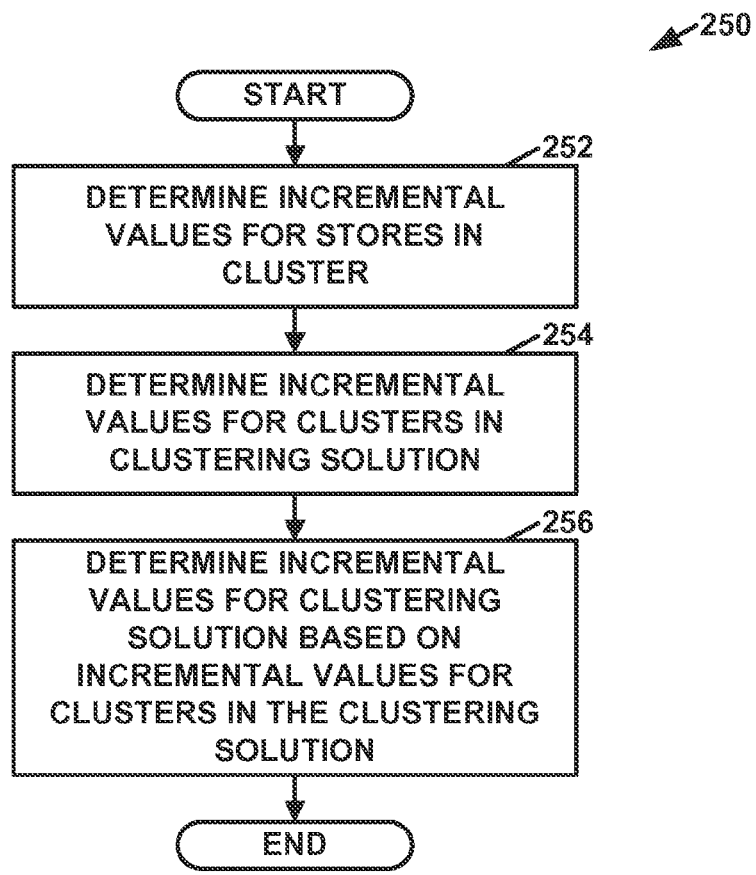
FIG. 6 is a flowchart that illustrates an example operation to determine an incremental value associated with a clustering solution.

Computing system 14 determines, based on the sales data for stores 12, incremental values associated with a plurality of clustering solutions (204). As indicated above, each of the clustering solutions group stores 12 of retailer 10 into clusters in a different way. The incremental values associated with the clustering solutions indicate differences between estimated revenues associated with the clustering solutions and revenues associated with a baseline clustering solution. FIG. 6, described in detail below, is a flowchart that illustrates an example operation to determine an incremental value associated with a clustering solution.

Computing system 14 then determines, based on the incremental values associated with the clustering solutions, an appropriate number of clusters into which to group stores 12 of retailer 10 (206). Clustering solutions that group the stores into more or fewer clusters than the appropriate number of clusters tend to be (i.e., have a tendency to be) associated with incremental values that are the same or lower than clustering solutions that group the stores into the appropriate number of clusters.

After determining the appropriate number of clusters, a particular clustering solution is selected based at least in part on the determined appropriate number of clusters (208). In some examples, computing system 14 selects the clustering solution. In other examples, one or more people associated with retailer 10 selects the clustering solution. Furthermore, in some examples, the selected clustering solution has the appropriate number of clusters, while, in other examples, the selected clustering solution has more or fewer clusters than the appropriate number of clusters.

After selecting a particular clustering solution, retailer 10 distributes, based at least in part on the selected clustering solution, merchandise to stores 12 (210). For example, the selected clustering solution may include at least a first cluster and a second cluster. In this example, retailer 10 distributes a first assortment of items to stores in the first cluster and distributes a second assortment of items to stores in the second cluster. In this example, the first assortment of items includes more of a first brand and less of a second brand than the second assortment of items.

Figure 7:
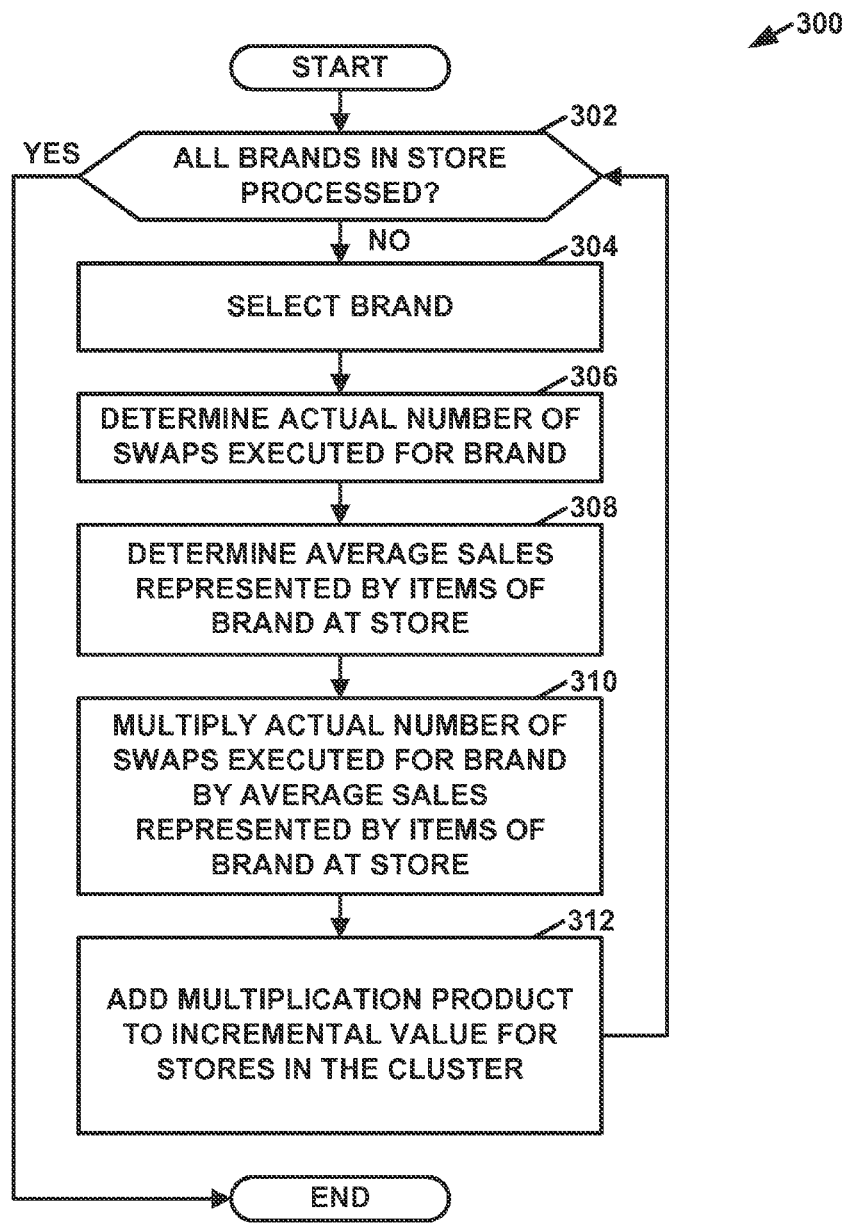
FIG. 7 is a flowchart that illustrates an example operation to determine incremental values for stores in a particular cluster.

FIG. 6 is a flowchart that illustrates an example operation 250 to determine an incremental value associated with a clustering solution. After computing system 14 starts operation 250, computing system 14 determines incremental values associated with each store in each cluster in the clustering solution (252). The incremental value associated with store is an estimated change in the store's revenue if the store's current (i.e., baseline) assortment of items is swapped with another assortment of items. Computing system 14 determines the incremental value associated with a store in various ways. FIG. 7, described in detail below, is a flowchart that illustrates an example operation to determine the incremental value associated with a store.

After determining the incremental values associated with each store in each cluster in the clustering solution, computing system 14 determines the incremental value associated with each respective cluster in the clustering solution (254). The incremental value associated with a cluster is an aggregation of the incremental values associated with the stores in the cluster. For example, computing system 14 determines the incremental value associated with a cluster based on a sum of the incremental values associated with the stores in the cluster. For instance, in this example, computing system 14 determines that the incremental value associated with a cluster is equal to the sum of non-negative incremental values associated with stores in the cluster. In this example, $V_{k,c}$ denotes the incremental value for a store k in cluster c. In this example, computing system 14 calculates the incremental value associated with cluster c as:

$$V_c = \Sigma_{k=1}^{m} V_{k,c}, \forall k \in c; V_{k,c} > 0$$

After determining the incremental values associated with each respective cluster in the clustering solution, computing system 14 determines an incremental value for the clustering solution (256). Computing system 14 determines the incremental value associated with the clustering solution based on the incremental values associated with each of the clusters indicated by the clustering solution. For instance, $V_S$ denotes the incremental value associated with the clustering solution S and $V_c$ denotes the incremental value associated with a cluster c indicated by the clustering solution S. Thus, computing system 14 calculates the incremental value associated with the clustering solution S as:

$$V_S = \sum_c V_c$$

FIG. 7 is a flowchart that illustrates an example operation 300 to determine incremental values for stores in a particular cluster. After computing system 14 starts operation 300, computing system 14 determines whether computing system 14 has processed all brands in the particular cluster (302). Computing system 114 determines that a brand in the particular cluster has been processed if computing system 14 has performed actions 304-312 with regard to the brand. The brands in the particular cluster are the brands sold in stores of the particular cluster.

Figure 8:
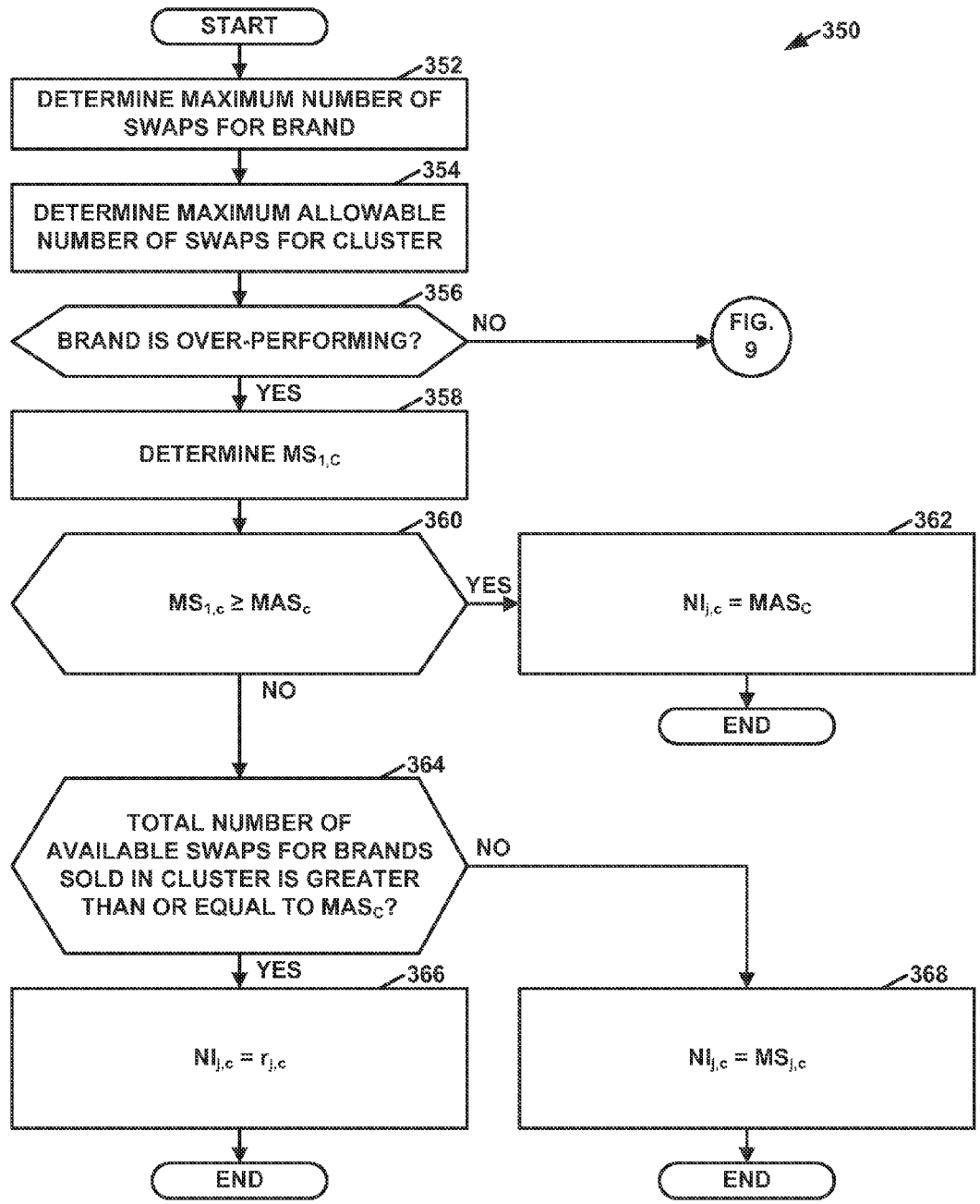
FIG. 8 is a flowchart that illustrates an example operation to determine an actual number of swaps allowed for a brand sold in a particular cluster.
Figure 9:
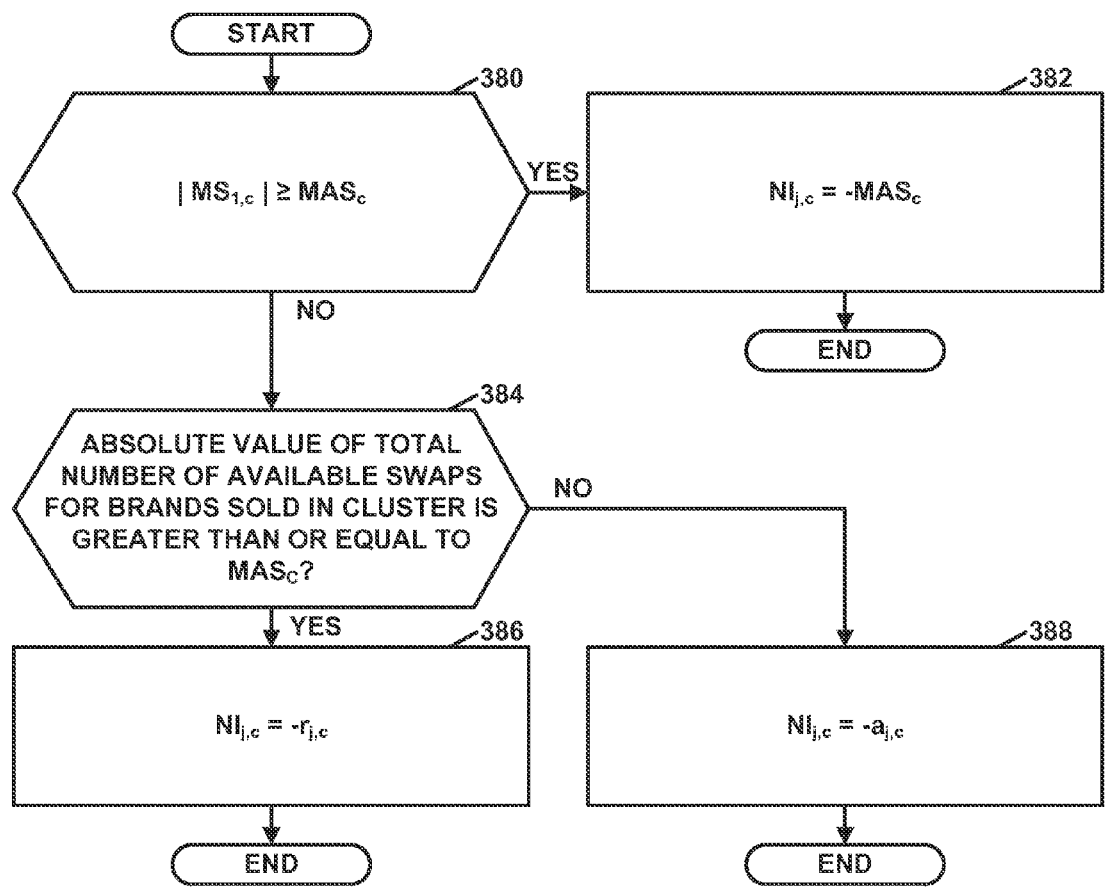
FIG. 9 is a flowchart that illustrates a continuation of the example operation of FIG. 8 to determine an actual number of swaps allowed for a brand sold in a particular cluster.

If not all brands in the particular cluster have been processed ("NO" of 302), computing system 14 selects one of the unprocessed brands (304). Next, computing system 14 determines an actual number of swaps executed for the selected brand in stores of the particular cluster (306). A "swap" occurs when one assortment of items in a product group is substituted for a different assortment of items in the product group. For example, a swap occurs when the shelf space devoted to diapers of brand X is increased at the expense of the shelf space devoted to diapers of brand Y. A product group is a category of similar items, such as diapers, men's shirts, toothbrushes, and so on. Hence, an increase in the number of items in a product group that are associated with a first brand and sold in the particular cluster results in a corresponding decrease in the number of items in the product group that are associated with a second brand sold in the particular cluster. Retailer 10 may define the product groups according to its own needs. Computing system 14 determines the actual number of swaps executed for the selected brand in various ways. FIGS. 8 and 9, described in detail below, are flowcharts that illustrate an example operation to determine the actual number of swaps executed for a brand.

Furthermore, computing system 14 determines the average sales represented by items associated with the selected brand (308). Where $S_{j,k}$ indicates the sales of brand j at store k and $I_{j,k}$ indicates the number of items available for brand j at store k, the average sales represented by items associated with brand j in store k is given as:

$$R_{j,k} = \frac{S_{j,k}}{I_{j,k}}$$

Next, computing system 14 multiplies the average sales represented by items associated with the selected brand by the actual number of swaps executed for the brand (310). Computing system 14 then adds the product of this multiplication to an intermediate version of the incremental value associated with the store (312). After adding the product to the incremental value associated with the store, computing system 14 determines whether there are any additional unprocessed brands sold at the store (302). If so, computing system 14 performs actions 304-312 with respect to another unprocessed brand. If all brands in the particular cluster have been processed ("YES" of 302), computing system 14 ends operation 300.

For example, $R_{j,k}$ indicates the average sales represented by items associated with a brand j in store k. $NI_{j,c}$ indicates the actual number of swaps executed for brand j in the cluster c. As described below with regard to FIG. 10, $CP_{j,c}$ denotes the proportion of items to be swapped for brand j in cluster c. In this example, computing system 14 calculates the incremental value associated with store k in cluster c as:

$$V_{k,c} = \sum_{j \in k} (R_{j,k} * NI_{j,c} * CP_{j,c}),$$

$$\forall j, k, c$$

Although the example of FIG. 7 is explained with reference to brands, the example of FIG. 7 is generally applicable to other classification parameters. A brand is just one example of a classification parameter. Other example classification parameters include attributes of items, such as physical size of items, physical weight of items, sizes of apparel items, color silhouette of items, and so on. In this way, a plurality of values of a classification parameter is associated with items sold at the stores in the cluster. Thus, the example of FIG. 7 may be generalized such that for each respective store in the cluster and for each value of the classification parameter sold at the respective store, computing system 14 determines an actual number of swaps executed for the value of the classification parameter. Each of the swaps is a substitution of an assortment of items associated with the value of the classification parameter with an assortment of items associated with a different value of the classification parameter. Furthermore, computing system 14 determines an average sales represented by items associated with the value of the classification parameter. Computing system 14 then multiplies the average sales represented by items associated with the value of the classification parameter by the actual number of swaps executed for the value of the classification parameter. Computing system 14 then adds a product of the multiplication to an intermediate version of the incremental value associated with the respective store.

FIG. 8 is a flowchart that illustrates an example operation 350 to determine an actual number of swaps allowed for a brand sold in a particular cluster. After computing system 14 starts operation 350, computing system 14 determines a maximum number of available swaps for the brand (352). Computing system 14 determines the maximum number of swaps available for the brand in various ways. For example, FIG. 10, described in detail below, is a flowchart that illustrates an example operation to determine the maximum number of swaps available for a brand sold in a particular cluster.

In addition, computing system 14 determines a maximum allowable number of swaps for the cluster (354). The maximum number of swaps allowed for the cluster constrains the maximum number of swaps performed in the cluster. Computing system 14 uses the maximum number of swaps allowed for the cluster to constrain the maximum number of swaps performed in the cluster because the space in stores 12 allocated to a product group may be fixed.

The maximum allowable number of swaps for a cluster c is denoted as $MAS_c$ and the maximum number of available swaps for a brand j sold in cluster c is denoted as $MS_{j,c}$. Computing system 14 determines $MAS_c$ as:

$$MAS_c = \min_{MS_{j,c}} \left\{ \sum_{j: MS_{j,c} \geq 0} MS_{j,c} \middle| \sum_{j: MS_{j,c} \leq 0} -MS_{j,c} \right\}$$

That is, computing system 14 determines $MAS_c$ as the lesser of the sum of non-negative maximum available swaps for the brands sold in cluster c or the sum n of negatives of the non-positive maximum available swaps for the brands sold in cluster c.

Computing system 14 also determines whether the brand is over-performing, at stores within the cluster when compared to average sales of the brand across retailer 10, given the space allocated for the brand at the stores within the cluster (356). Computing system 14 determines, based on a distance metric for the brand, whether the brand is over-performing, at stores within the cluster when compared to the average sales of the brand across retailer 10, given the space allocated for the brand at the stores within the cluster. For instance, if the distance metric of the brand exceeds a threshold, computing system 14 determines that the brand is over-performing, at stores within the cluster, given the space allocated for the brand at the stores within the cluster. In this way, computing system 14 determines, based at least in part on a distance metric for the brand, the actual number of swaps executed for the brand.

If computing system 14 determines that the brand is not over-performing, at stores within the cluster when compared to the average sales of the brand across retailer 10, given the space allocated for the brand at the stores within the cluster ("NO" of 356), computing system 14 performs the portion of operation 350 illustrated in FIG. 9. However, if computing system 14 determines that the brand is over-performing, at stores within the cluster, given the space allocated for the brand at the stores within the cluster ("YES" of 356), computing system 14 determines a value $MS_{1,c}$ (358). The value $MS_{1,c}$ is equal to the greatest of $MS_{j,c}$. In other words, $MS_{1,c} = \max_{j \in c} MS_{j,c}$.

Next, computing system 14 determines whether $MS_{1,c}$ is greater than or equal to $MAS_c$ (360). In other words, computing system 14 determines whether $MS_{1,c}$ is greater than or equal to the maximum allowable swaps for the cluster. If $MS_{1,c}$ is greater than or equal to $MAS_c$ ("YES" of 360), computing system 14 determines that $NI_{j,c}$ is equal to $MAS_c$ (362). That is, $$NI_{j,c} = MAS_c, \text{ if } MS_{1,c} \geq MAS_c$$

On the other hand, if $MS_{1,c}$ is not greater than or equal to $MAS_c$ ("NO" of 360), computing system 14 determines whether the total number of available swaps for brands sold in the cluster is greater than or equal to $MAS_c$ (364). Utile total number of available swaps for brands sold in the cluster is greater than or equal to $MAS_c$ ("YES" of 364), computing system 14 determines that $NI_{j,c}$ is equal to a remaining number of swaps available for the brand (366). The remaining number of swaps available for brand j in cluster c is denoted as $r_{j,c}$. $r_{c,j}$ is equal to $MAS_c$ minus the sum of $MS_{j,c}$ for all brands in cluster c, except the brand having the greatest number of maximum available swaps among the brands in cluster c. That is, where $MS_{j,c}$ denotes the number of swaps allowed for brand j in cluster c, computing system 14 determines $r_{c,j}$ as:

$$r_{j,c} = MAS_c - \sum_{j \in c} MS_{j,c},$$

$$\forall j \neq 1$$

However, if the total number of available swaps for brands sold in the cluster is not greater than or equal to $MAS_c$ ("NO" of 364), computing system 14 determines that $NI_{j,c}$ is equal to $MS_{j,c}$ (368). As indicated above, $MS_{j,c}$ denotes the number of swaps allowed for brand j in cluster c.

FIG. 9 is a flowchart that illustrates a continuation of the example operation 350 of FIG. 8. After computing system 14 starts the continuation of operation 350 illustrated in FIG. 9, computing system 14 determines whether an absolute value of $MS_{1,c}$ is greater than or equal to $MAS_c$ (380). In the context of FIG. 9, $MS_{j,c}$ is equal to the least of $MS_{j,c}$. In other words, in the context of FIG. 9, $MS_{1,c} = \min_{j \in c} MS_{j,c}$. If $MS_{1,c}$ is greater than $MAS_c$ ("YES" of 380), computing system 14 determines that $NI_{j,c}$ is equal to the negative of $MAS_c$ (382).

On the other hand, if $MS_{1,c}$ is not greater than $MAS_c$ ("NO" of 380), computing system 14 determines whether the absolute value of the total number of available swaps for brands sold in the cluster is greater than or equal to $MAS_c$ (384). If the absolute value of the total number of available swaps for brands sold in the cluster is greater than or equal to $MAS_c$ ("YES" of 384), computing system 14 determines that $NI_{j,c}$ is equal to the negative of the remaining number of swaps available for the brand (386). In other words, computing system 14 determines that $NI_{j,c} = -r_{j,c}$. In the context of FIG. 9, computing system 14 determines $r_{j,c}$ as:

$$r_{j,c} = MAS_c - \left| \sum_{j \in c} MS_{j,c} \right|,$$

$$\forall j \neq 1$$

If the absolute value of the total number of available swaps for brands sold in the cluster is not greater than or equal to $MAS_c$ ("NO" of 384), computing system 14 determines that $NI_{j,c}$ is equal to the negative of the number of available swaps for the brand in the cluster (388). In other words, computing system 14 determines that $NI_{j,c} = MS_{j,c}$.

Figure 10:
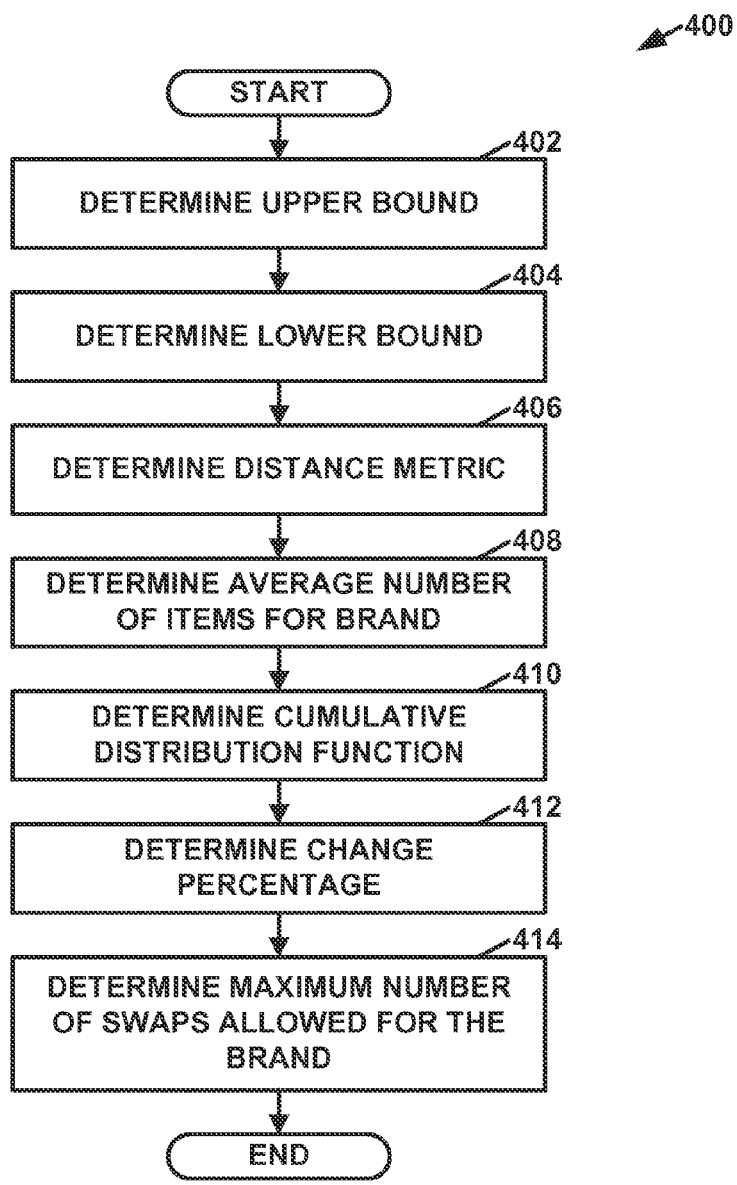
FIG. 10 is a flowchart that illustrates an example operation to determine a maximum number of swaps allowed for a brand in a particular cluster.

FIG. 10 is a flowchart that illustrates an example operation 400 to determine a maximum number of swaps allowed for a brand in a particular cluster.

After computing system 14 starts operation 400, computing system 14 determines an upper bound for the brand in the particular cluster (402). Computing system 14 determines the upper bound as the maximum number of items available for the brand in stores in the cluster. For example, $UB_{j,c}$ denotes the upper bound for brand j in cluster c and $I_{j,k}$ denotes the number of items available for brand j in store k. In this example, computing system 14 determines $UB_{j,c}$ as:

$$UB_{j,c} = \max_{k \in c} \{I_{j,k}\}$$

In the example of FIG. 10, the maximum allowable number of swaps for a brand in a particular cluster is based on an average assortment for retailer 10, as a whole. For example, if stores in the cluster have 15 items of the brand and the average number of items of the brand in all stores of retailer 10 is 19, the upper bound is 19. Furthermore, in this example, computing system 14 may determine, based on the brand's sales differentiation from other brands, that 7 additional items should be sold for the brand at stores of the cluster. Adding 7 additional items for the brand would result in 22 items of the brand being sold at stores of the cluster. Because 22 items is above the average assortment for the brand for retailer 10 as a whole (i.e., 19), limiting the number of items added for the brand to 19 may keep the number of items of the brand sold at stores of the cluster to a reasonable amount. Thus, in this example, the maximum allowable number of swaps is equal to 4.

In addition, computing system 14 determines a lower bound for the brand in the particular cluster (404). Computing system 14 determines the lower bound as the minimum number of items available for the brand in stores in the cluster. For example, $LB_{j,c}$ denotes the lower bound for brand j in cluster c and $I_{j,k}$ denotes the number of items available for brand j in store k. In this example, computing system 14 determines $LB_{j,c}$ as:

$$LB_{j,c} = \min_{k \in c} \{I_{j,k}\} \forall j, k, c$$

The upper bound and the lower bound set the upper and lower bounds for the number of items being swapped.

Computing system 14 determines the upper bound and the lower bound in order to constrain the swaps to the maximum and minimum level of assortment availability across retailer 10. For example, stores in a cluster c may sell, on average, fifteen items associated with a brand j. However, in this example, the maximum number of items associated with brand j sold in any cluster of retailer 10 may be nineteen items. Hence, in this example, the upper bound for brand j in cluster c (i.e., $UB_{j,c}$) is equal to nineteen. In this example, the upper bound for brand j in cluster c prevents computing system 14 from performing more than four swaps. For instance, the upper bound restricts computing system 14 such that computing system 14 may not replace five items associated with other brands with five items associated with brand j, but may replace four items associated with other brands with four items associated with brand j. Similar examples are applicable to the lower bound.

Figure 11:
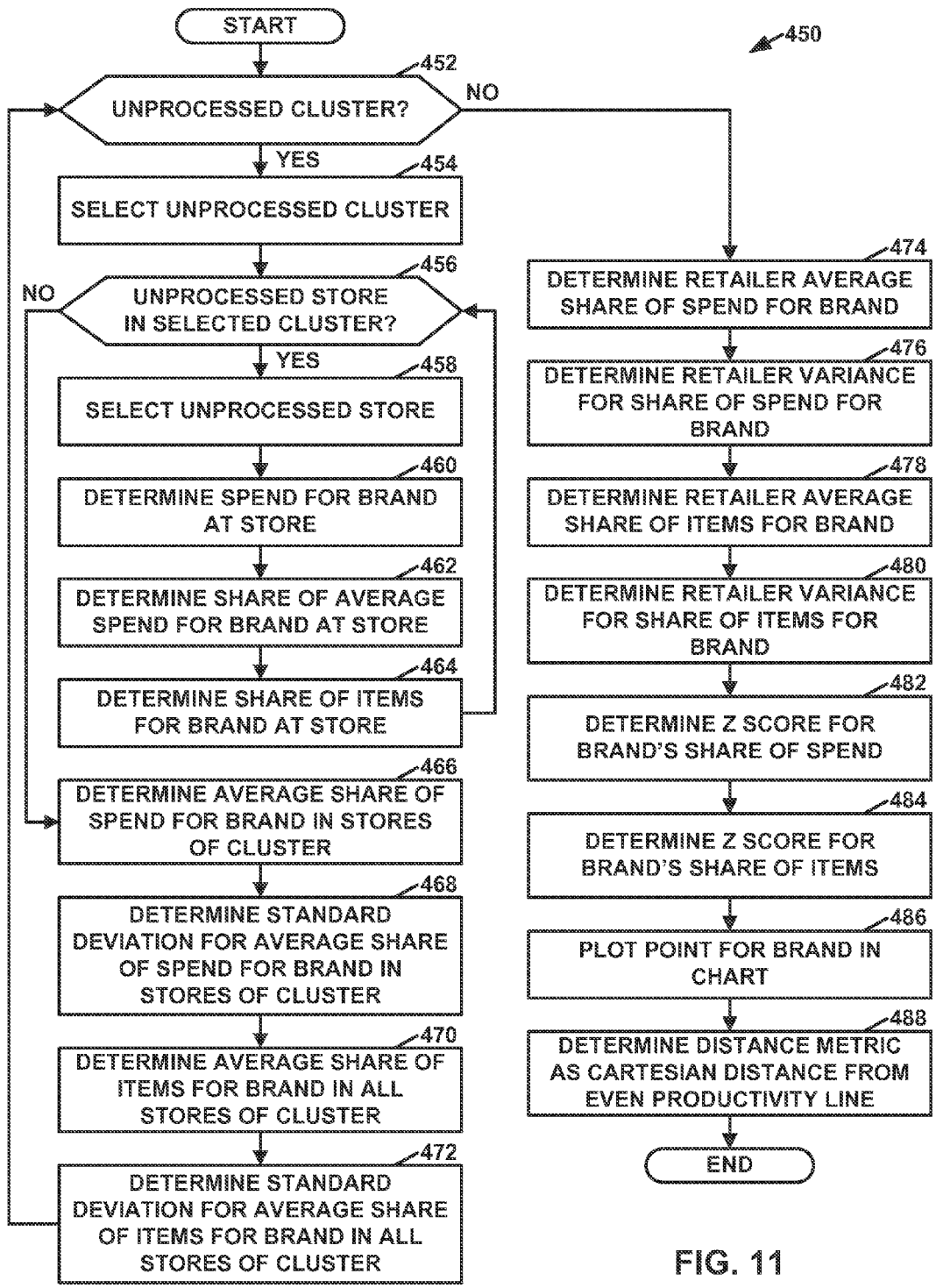
FIG. 11 is a flowchart that illustrates an example operation to determine a distance metric for a brand in a particular cluster.

Furthermore, computing system 14 determines a distance metric for the brand (406). The distance metric is an indicator of performance of the brand. More generally, the distance metric is an indicator of performance of items associated with a value of a classification parameter, such as a brand. Computing system 14 determines the distance metric for the brand in various ways. FIG. 11, described in detail below, is a flowchart that illustrates an example operation to determine the distance metric for the brand.

Computing system 14 also determines an average number of items for the brand in the particular cluster (408). For example, $I_{j,c}^{avg}$ denotes the average number of items for brand j in cluster c and $N_c$ indicates a number of stores in cluster c. Computing system 14 determine $I_{j,c}^{avg}$ as:

$$I_{j,c}^{avg} = \frac{\sum_{k \in c} I_{j,c}}{N_c} \forall j, c$$

In addition, computing system 14 determines a cumulative distribution function for the z score represented by a distance metric for the brand in the particular cluster (410). For example, $\phi(t)$ denotes the cumulative distribution function for the z score represented by a distance metric $D_{j,c}$ for a brand j in a cluster c.

Computing system 14 determines, based on the cumulative distribution function and the distance metric for the brand, a change percentage for the brand (412). If the distance metric for the brand in the particular cluster is less than −0.5 or greater than 0.5, computing system 14 determines that a change percentage for the brand in the particular cluster is equal to $\phi(t)$−0.5. Otherwise, if the distance metric for the brand in the particular duster is not less than −0.5 and not greater than 0.5, computing system 14 determines that the change percentage for the brand in the particular cluster is equal to 0. That is, $$CP_{j,c} = \begin{cases} \phi(t) - 0.5 & \forall D_{j,c} < -0.5; \forall D_{j,c} > 0.5 \\ 0 & \text{Otherwise} \end{cases}$$

The change percentage for the brand in the particular cluster determines the proportion of items to be swapped thr the brand sold in the particular cluster based on the distance metric for the brand sold in the particular cluster. Consequently, computing system 14 performs more swaps on a brand that has high or low performance as compared to a brand whose performance is closer to the all chain average. Thus, if the distance metric is higher, the number of swaps may be higher, and vice versa, subject to the upper and lower bounds.

The change percentage for the brand imposes a constraint in addition to the upper bound and lower bound. For example, there may be two brands, brand 1 and brand 2. In this example, brand 1 has an assortment of fifteen items and brand 2 has an assortment of five items. Furthermore, in this example, brand 1 and brand 2 are differentiated similarly, having distance metrics of 1.23, which represents 30% of the variation. In this example, swapping is proportional to this variation. Thus, brand 1 may swap up to 4.5 items (15*30%) and brand 2 may swap up to 1.5 items (5*30%). In this way, the swapping may be proportional.

After determining the change percentage for the brand in the particular cluster, computing system 14 determines the maximum number of swaps allowed for the brand (414). Using the upper bound $UB_{j,c}$, lower bound $LB_{j,c}$, average number of items $I_{j,c}^{avg}$, distance metric $D_{j,c}$, and change percentage $CP_{j,c}$ for a brand j in a cluster c, computing system 14 determines the maximum number of swaps $MS_{j,c}$ for brand j in cluster c as follows:

$$MS_{j,c} \begin{cases} (CP_{j,c} * I_{j,c}^{avg}) & \text{if } (I_{j,c}^{avg} * (1 + CP_{j,c})) \geq LB_{j,c} \forall c, j; D_{j,c} < -0.5 \\ (LB_{j,c} - I_{j,c}^{avg}) & \text{if } (I_{j,c}^{avg} * (1 + CP_{j,c})) < LB_{j,c} \forall c, j; D_{j,c} < -0.5 \\ (CP_{j,c} * I_{j,c}^{avg}) & \text{if } (I_{j,c}^{avg} * (1 + CP_{j,c})) \leq UB_{j,c} \forall c, j; D_{j,c} > 0.5 \\ (UB_{j,c} - I_{j,c}^{avg}) & \text{if } (I_{j,c}^{avg} * (1 + CP_{j,c})) > UB_{j,c} \forall c, j; D_{j,c} > 0.5 \end{cases}$$

FIG. 11 is a flowchart that illustrates an example operation 450 to determine a distance metric for a brand in a particular cluster. After computing system 14 starts operation 450, computing system 14 determines whether there are additional clusters in the clustering solution yet to process (452). Computing system 14 determines that a cluster has been processed if computing system 14 has performed actions 454-472 with regard to the cluster. If there are one or more clusters in the clustering solution yet to process ("YES" of 452), computing system 14 selects one of the unprocessed clusters (454). Computing system 14 then determines whether there are one or more unprocessed stores in the selected cluster (456). Computing system 14 determines that a store is an unprocessed store if computing system 14 has not yet performed actions 458-464 with regard to the store. If there are one or more unprocessed stores in the selected cluster ("YES" of 456), computing system 14 selects one of the unprocessed stores in the selected cluster (458).

After selecting the unprocessed store, computing system 14 determines, based at least in part on the sales data for the selected store, an amount of spend for the brand at the selected store (460). For example, $S_{j,k}$ denotes the sales of a brand j at store k, $I_{j,k}$ denotes the number of items available for brand j at store k, and $R_{j,k}$ denotes the amount of spend for brand j at store k. In this example, computing system 14 determines the amount of spend per item for the brand at the selected store as:

$$R_{j,k} = \frac{S_{j,k}}{I_{j,k}}$$

In addition, computing system 14 determines, based at least in part on the sales data for the selected store, a share of average spend for the brand at the selected store (462). For example, $R_{j,k}$ denotes the amount of spend per item for brand j at store k and $SS_{j,k}$ denotes the share of spend for brand j at store k. In this example, computing system 14 determines the share of spend for brand j at store k as:

$$SS_{j,k} = \frac{S_{j,k}}{\sum_{j,k} S_{j,k}}$$

Computing system 14 also determines, based at least in part on the sales data for the selected store, a share of items for the brand at the selected store (464). For example, $I_{j,k}$ denotes the number of items available for brand j at store k and $SI_{j,k}$ denotes the share of items for brand j at store k. In this example, computing system 14 determines the share of items for brand j at store k as:

$$SI_{j,k} = \frac{I_{j,k}}{\sum_{j,k} I_{j,k}}$$

After determining the share of items for the brand in the selected store, computing system 14 determines whether there are any unprocessed stores in the selected cluster (456). If so, computing system 14 selects another unprocessed store in the selected cluster, and so on. In this way, computing system 14 determines a share of spend for the brand at each store in the selected cluster and a share of items for the brand in each store in the selected cluster.

Table 1, below, illustrates example sales data and baseline metrics for store 83 in a cluster (i.e., cluster 1). The baseline metrics in the following table are a brand's spend and items at a store, the brand's share of spend at the store associated with the brand, and the brand's share of items at the store.

TABLE 1

| Cluster | Store | Brand | Spend | Items | Share of spend | Share of items |
|---------|-------|-------|-------|-------|----------------|----------------|
| 1 | 83 | 1 | 120 | 1 | 0.002 | 0.02 |
| 1 | 83 | 2 | 17619 | 17 | 0.282 | 0.29 |
| 1 | 83 | 3 | 1645 | 5 | 0.026 | 0.09 |
| 1 | 83 | 4 | 18679 | 18 | 0.299 | 0.31 |
| 1 | 83 | 5 | 24503 | 17 | 0.392 | 0.29 |

If there are no unprocessed stores in the selected cluster ("NO" of 456), computing system 14 determines an average share of spend for the brand in stores of the selected cluster (466). For example, $SS'_{j,c}$ denotes the average share of spend for brand j for stores in cluster c and $N_c$ denotes the number of stores in cluster c. In this example, computing system 14 determines $SS'_{j,c}$ as:

$$SS'_{j,c} = \frac{\sum_{k \in c} SS_{j,k}}{N_c}$$

In addition, computing system 114 determines a standard deviation for the average share of spend for the brand at stores of the selected cluster (468). For example, $\sigma_{j,c}^{SS}$ denotes the standard deviation for the average share of spend for brand j in cluster c. In this example, computing system 14 determines $\sigma_{j,c}^{SS}$ as:

$$\sigma_{j,c}^{SS} = \sqrt{\frac{(SS_{j,k} - SS'_{j,k})^2}{N_c - 1}}$$

Computing system 14 determines an average share of items for the brand in all stores of the selected cluster (470). For example, $SI'_{j,c}$ denotes the average share of items associated with brand j for stores in cluster c and $SI_{j,k}$ denotes the share of items for brand j at store k. In this example, computing system 14 determines $SI'_{j,c}$ as:

$$SI'_{j,c} = \frac{\sum_{k \in c} SI_{j,k}}{N_c}$$

Computing system 14 also determines a standard deviation for the average share of items for the brand in all stores of the selected cluster (472). For example, $\sigma_{j,c}^{SI}$ of denotes the standard deviation tier the average share of items for the brand. In this example, computing system 14 determines $\sigma_{j,c}^{SI}$ as:

$$\sigma_{j,c}^{SI} = \sqrt{\frac{(SI_{j,k} - SI'_{j,k})^2}{N_c - 1}}$$

Computing system 14 then determines again whether there are any unprocessed clusters in the clustering solution (452). If there are one or more unprocessed clusters, computing system 14 selects another unprocessed cluster, and performs acts 454-472 with another unprocessed cluster in the clustering solution.

Table 2, below, illustrates example cluster-level data for brands in a particular cluster.

TABLE 2

| Cluster | Brand | Average cluster share of items | Average cluster share of spend | Standard deviation of cluster share of items | Standard deviation of cluster share of spend |
|---------|-------|--------------------------------|--------------------------------|----------------------------------------------|----------------------------------------------|
| 4 | 1 | 0.015198 | 0.00436 | 1E-04 | 0.003 |
| 4 | 2 | 0.030602 | 0.02633 | 0.0004 | 0.0152 |
| 4 | 3 | 0.270482 | 0.25241 | 0.005 | 0.0371 |
| 4 | 4 | 0.076506 | 0.09498 | 0.0009 | 0.0442 |
| 4 | 5 | 0.030602 | 0.02713 | 0.0004 | 0.0125 |
| 4 | 6 | 0.275421 | 0.22299 | 0.0034 | 0.0334 |
| 4 | 7 | 0.306024 | 0.37318 | 0.0037 | 0.0271 |

Otherwise, if there are no unprocessed clusters in the clustering solution ("NO" of 452), computing system 14 determines a retailer average share of spend associated with the brand (474). For example, $SS''_j$ denotes the retailer average share of spend associated with brand j. In this example, computing system 14 determines $SS''_j$ as:

$$SS''_j = \frac{\sum_{k=1}^{n} SS_{j,k}}{m}$$

In addition, computing system 14 determines a retailer variance for the share of spend associated with the brand (476). For example, $\sigma_{SS}$ denotes the retailer variance for the share of spend associated with the brand. In this example, computing system 14 determines $\sigma_{SS}$ as:

$$\sigma_{SS} = \sqrt{\frac{(SS'_{j,c} - SS''_j)^2}{\sum_{c=1}^{1} c}}$$

Computing system 14 then determines a retailer average share of items associated with the brand (478). For example, $SI''_j$ denotes the retailer average share of items associated with brand j. In this example, computing system 14 determines $SI''_j$ as:

$$SI''_j = \frac{\sum_{j=1}^{n} SI_{j,k}}{m}$$

Computing system 14 also determines a retailer variance for the share of items associated with brands sold at retailer 10 (480). For example, $\sigma_{SI}$ denotes the retailer variance for the share of items associated with brands sold at retailer 10. In this example, computing system 14 determines $\sigma_{SI}$ as:

$$\sigma_{SI} = \sqrt{\frac{(SI'_{j,c} - SI''_j)^2}{\sum_{c=1}^{p} c}}$$

Next, computing system 14 determines a z score for the brand's share of spend (482). For example, $Z_{j,c}^{SS}$ denotes the z score for the brand's share of spend. In this example, computing system 14 determines $Z_{j,c}^{SS}$ as:

$$Z_{j,c}^{SS} = \frac{SS'_{j,c} - SS''_j}{\sigma_{SS}}$$

In addition, computing system 14 determines a z score for the brand's share of items sold by retailer 10 (484). For example, $Z_{j,c}^{SI}$ denotes the z score for the brand's share of items. In this example, computing system 14 determines $Z_{j,c}^{SI}$ as:

$$Z_{j,c}^{SI} = \frac{SI'_{j,c} - SI''_j}{\sigma_{SI}}$$

Table 3, below, illustrates example retailer-level data for brands.

TABLE 3

| Overall average | Average all store share of items | Average all store share of spend | Standard deviation of all store share of items | Standard deviation of all stores share of spend |
|---|---|---|---|---|
| 1 | 0.016375 | 0.015597 | 0.000823 | 0.008843 |
| 2 | 0.028389 | 0.058533 | 0.004959 | 0.033206 |
| 3 | 0.291167 | 0.234393 | 0.014156 | 0.038556 |
| 4 | 0.081727 | 0.115258 | 0.004495 | 0.035737 |
| 5 | 0.026258 | 0.020625 | 0.006394 | 0.017699 |
| 6 | 0.295289 | 0.245428 | 0.014024 | 0.033116 |
| 7 | 0.297309 | 0.363639 | 0.009292 | 0.047151 |

After determining the z scores for the brand's share of spend and the brand's share of items sold by retailer 10, computing system 14 plots a point for the brand on a chart (486). A first axis of the chart corresponds to z scores for share of spend and a second axis of the chart corresponds to z scores for shares of items sold by retailer 10. After plotting the point for the brand on the chart, computing system 14 determines the distance metric for the brand for the particular cluster as a Cartesian perpendicular distance from the point to an even productivity line (488). The even productivity line is a baseline measure of performance that represents a situation where z scores for share of spend is equal to the z scores for share of items. In some examples, $D_{c,j}$ denotes the distance metric brand j in cluster c, $Z_{j,c}^{SS}$ denotes the z score for brand j in cluster c, $Z_{j,c}^{SI}$ denotes the z score for the share of items of brand j in cluster c, and computing system 14 determines the distance metric as:

$$D_{c,j} = \sqrt{\frac{2(Z_{j,c}^{SS} - Z_{j,c}^{SI})^2}{2}}$$

Furthermore, in some examples, the even productivity line may be the set of points where $Z_{j,c}^{SS}$ is equal to $Z_{j,c}^{SI}$ for all brands j and cluster c.

In this way, computing system 14 determines the distance metric as a Cartesian perpendicular distance from an even productivity line to a point for a value of a classification parameter (e.g., a brand). A location of the point is based on a z score for a share of spend associated with the value of the classification parameter and is based on a z score for a share of items sold at the respective store that are associated with the value of the classification parameter.

Figure 12:
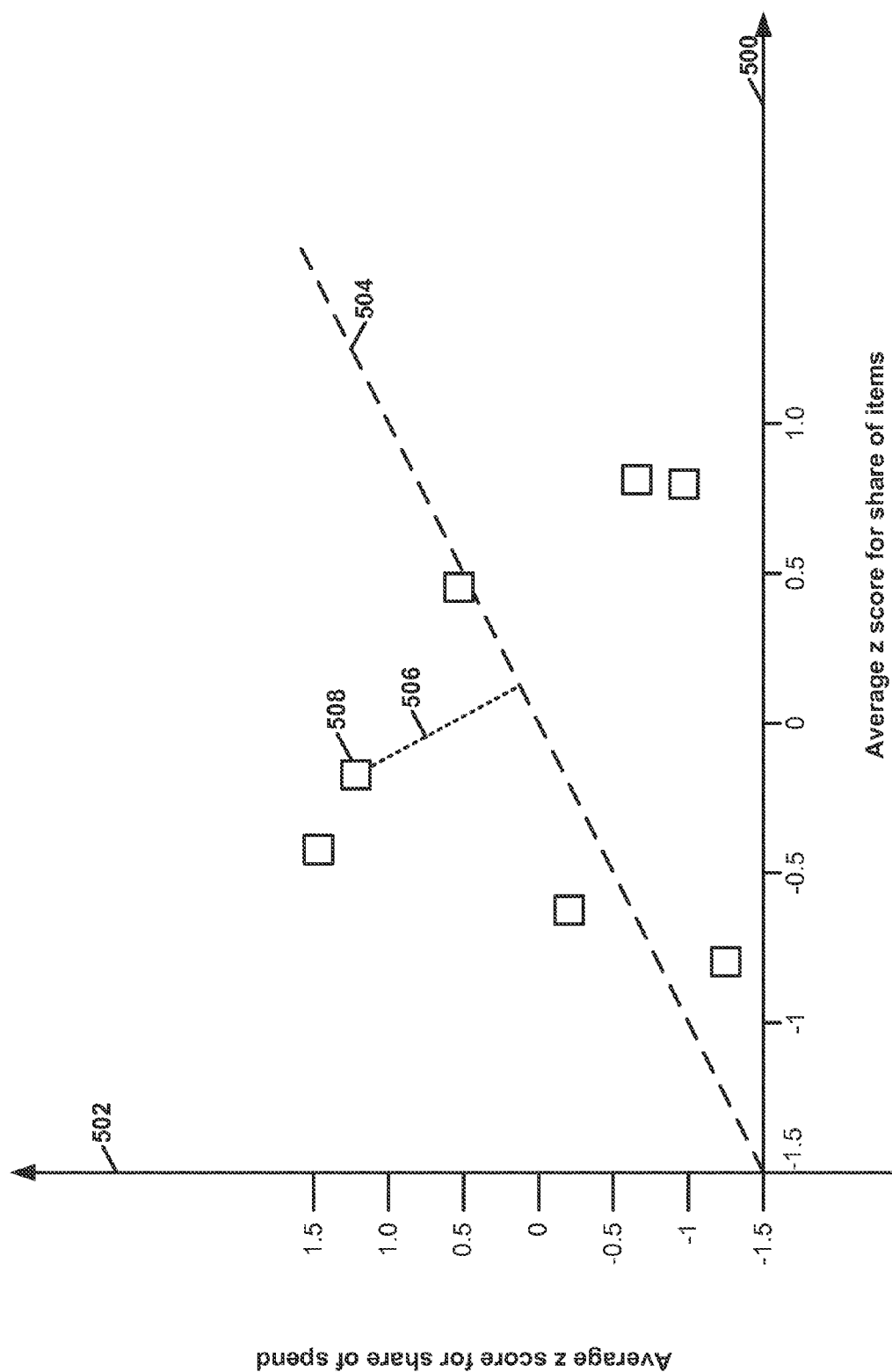
FIG. 12 is a conceptual diagram that illustrates an example chart on which points associated with z scores of brands are plotted.

FIG. 12 is a conceptual diagram that illustrates an example chart on which points associated with z scores of brands are plotted. As illustrated in the example of FIG. 12, the chart has a horizontal axis 500 and a vertical axis 502. Horizontal axis 500 corresponds to z scores for shares of items sold by retailer 10. Vertical axis 502 corresponds to z scores for share of spend. In the example of FIG. 12, squares indicate points associated with brands sold in a cluster. A line 504 indicates the even productivity line. A line 506 extends from a point 508 to line 504. Line 506 meets line 504 at right angles. The distance metric for the brand associated with point 508 is equal to the length of line 506.

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type.

FIGS. 8-12 are explained with regard to brands. However, like the example of FIG. 7, FIGS. 8-12 are generally applicable to other classification parameters instead of brands. For example, FIGS. 8-12 may be applicable to item weight. In this example, different values of the classification parameter (i.e., item weight) may be different weight ranges, such as less than 1 kg, between 1 kg and 2 kg, between 2 kg and 5 kg, and so on.

In one or more examples, the functions described are implemented in hardware, software, firmware, or any combination thereof. If implemented in software, the functions are stored on or transmitted over, as one or more instructions or code, a computer-readable medium and executed by a hardware-based processing unit. Computer-readable media include computer-readable storage media, which corresponds to a tangible medium such as data storage media, or communication media including any medium that facilitates transfer of a computer program from one place to another, e.g., according to a communication protocol. In this manner, computer-readable media generally correspond to (1) tangible computer-readable storage media which is non-transitory or (2) a communication medium such as a signal or carrier wave. Data storage media are any available media that can be accessed by one or more computers or one or more processors to retrieve instructions, code and/or data structures for implementation of the techniques described in this disclosure.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein is provided within dedicated hardware and/or software modules. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:

determining, by a computing system, incremental values associated with a plurality of clustering solutions, wherein each of the clustering solutions groups stores of a retailer into clusters in a different way, wherein for each clustering solution in the plurality of clustering solutions, the incremental value associated with the clustering solution indicates a difference between an estimated revenue associated with the clustering solution and revenue associated with a baseline clustering solution, wherein determining the incremental values associated with the plurality of clustering solutions comprises, for each respective clustering solution from the plurality of clustering solutions:

determining, by the computing system, incremental values associated with each of the clusters into which the respective clustering solution groups the stores, wherein the incremental value associated with each of the clusters into which the respective clustering solution groups the stores is an aggregation of incremental values associated with the stores in the cluster, and the incremental value associated with each store in the cluster is an estimated change in a revenue of the store if a current assortment of items in the store is swapped with another assortment of items; and determining, by the computing system, the incremental value associated with the respective clustering solution based on a sum of the incremental values associated with each of the clusters into which the respective clustering solution groups the stores;

determining, by the computing system and based on the incremental values associated with the plurality of clustering solutions, an appropriate number of clusters into which to group the stores of the retailer, wherein the appropriate number of clusters corresponds to a turning point of a best fit curve through a plurality of points, each respective point of the plurality of points corresponding to a respective clustering solution of the plurality of clustering solutions, the respective point having a first coordinate corresponding to a number of clusters associated with the respective clustering solution and a second coordinate corresponding to the incremental value associated with the respective clustering solution;

selecting, based at least on part on the appropriate number of clusters, a particular clustering solution in the plurality of clustering solutions; and distributing, based at least in part on the particular clustering solution, merchandise to the stores.

2. The method of claim 1, wherein determining the incremental values associated with each of the clusters into which the respective clustering solution groups the stores comprises, for each respective cluster into which the respective clustering solution groups the stores:

determining, by the computing system, the incremental values associated with each of the stores in the respective cluster; and determining, by the computing system, the incremental value associated with the respective cluster based on a sum of the incremental values associated with each of the stores in the respective cluster.

3. The method of claim 2, wherein a plurality of values of a classification parameter are associated with items sold at the stores in the respective cluster;

wherein determining the incremental values associated with each of the stores in the respective cluster comprises, for each respective store in the respective cluster:

for each value of the classification parameter sold at the respective store:

determining, by the computing system, an actual number of swaps executed for the value of the classification parameter, each of the swaps being a substitution of an assortment of items associated with the value of the classification parameter with an assortment of items associated with a different value of the classification parameter;

determining, by the computing system, an average sales represented by items associated with the value of the classification parameter;

multiplying, by the computing system, the average sales represented by items associated with the value of the classification parameter by the actual number of swaps executed for the value of the classification parameter; and adding, by the computing system, a product of the multiplication to the incremental value associated with the respective store.

4. The method of claim 3, wherein different values of the classification parameter correspond to different brands.

5. The method of claim 3, wherein determining an actual number of swaps executed for the value of the classification parameter comprises determining, by the computing system and based at least in part on a distance metric for the value of the classification parameter, the actual number of swaps executed for the value of the classification parameter, the distance metric being an indicator of a performance of items associated with the value of the classification parameter.

6. The method of claim 5, further comprising determining, by the computing device, the distance metric as a Cartesian distance from an even productivity line to a point for the value of the classification parameter, a location of the point being based on a first z score and a second z score, the first z score being for a share of spend associated with the value of the classification parameter, the second z score being for a share of items sold at the respective store that are associated with the value of the classification parameter, the even productivity line being a baseline measure of performance that represents a situation where z scores for share of spend is equal to the z scores for share of items.

7. The method of claim 6, further comprising:

determining, by the computing device, the first z score such that the first z score is equal to $$\frac{SS'_{j,c} - SS''_j}{\sigma_{SS}},$$

where $SS'_{j,c}$ denotes an average share of spend associated the value of the classification parameter for stores in the cluster, $SS''_j$ denotes a retailer average share of spend for the items associated with the value of the classification parameter, and $\sigma_{SS}$ denotes a retailer variance for the share of spend for items associated with the value of the classification parameter; and determining, by the computing device, the second z score such that the second z score is equal to $$\frac{SI'_{j,c} - SI''_j}{\sigma_{SI}},$$

where $SI'_{j,c}$ denotes an average share of items associated with the value of the classification parameter in stores in the cluster, $SI''_j$ denotes a retailer average of share of items associated with the value of the classification parameter, and $\sigma_{SI}$ denotes a retailer variance for the share of items associated with the value of the classification parameter.

8. The method of claim 1, wherein determining the appropriate number of clusters comprises determining, by the computing system, the best fit curve based on a polynomial regression over the plurality of points, wherein the appropriate number of clusters is equal to a number of clusters associated with a maximum point of the curve.

9. A computing system comprising:

one or more processors; and one or more storage devices that store instructions that, when executed by the one or more processors, cause the computing system to:

determine incremental values associated with a plurality of clustering solutions, wherein each of the clustering solutions groups stores of a retailer into clusters in a different way, wherein for each clustering solution in the plurality of clustering solutions, the incremental value associated with the clustering solution indicates a difference between an estimated revenue associated with the clustering solution and revenue associated with a baseline clustering solution, wherein the instructions cause the computing system to determine the incremental values associated with the plurality of clustering solutions in part by causing the computing system to, for each respective clustering solution from the plurality of clustering solutions:

determine incremental values associated with each of the clusters into which the respective clustering solution groups the stores, wherein the incremental value associated with each of the clusters into which the respective clustering solution groups the stores is an aggregation of incremental values associated with the stores in the cluster, and the incremental value associated with each store in the cluster is an estimated change in a revenue of the store if a current assortment of items in the store is swapped with another assortment of items; and determine the incremental value associated with the respective clustering solution based on a sum of the incremental values associated with each of the clusters into which the respective clustering solution groups the stores;

determine an optimal cluster count based on the incremental values associated with the plurality of clustering solutions, the optimal cluster count indicating a number of clusters into which the stores are grouped, wherein the optimal cluster count corresponds to a turning point of a best fit curve through a plurality of points, each respective point of the plurality of points corresponding to a respective clustering solution of the plurality of clustering solutions, the respective point having a first coordinate corresponding to a number of clusters associated with the respective clustering solution and a second coordinate corresponding to the incremental value associated with the respective clustering solution; and select, based at least on part on the appropriate number of clusters, a particular clustering solution in the plurality of clustering solutions, wherein merchandise is distributed to the stores based at least in part on the particular clustering solution.

10. The computing system of claim 9, wherein for each respective cluster into which the respective clustering solution groups the stores, the instructions, when executed by the one or more processors, cause the computing system to:
determine the incremental values associated with each of the stores in the respective cluster; and
determine the incremental value associated with the respective cluster based on a sum of the incremental values associated with each of the stores in the respective cluster.

11. The computing system of claim 10, wherein for each respective store in the respective cluster, the instructions, when executed by the one or more processors, cause the computing system to:
for each brand sold at the respective store:
determine an actual number of swaps executed for the brand;
determine an average sales represented by items associated with the brand;
multiply the average sales represented by items associated with the brand by the actual number of swaps executed for the brand; and
add a product of the multiplication to the incremental value associated with the respective store.

12. The computing system of claim 9, wherein the instructions, when executed by the one or more processors, cause the computing system to determine the best fit curve based on a polynomial regression over the plurality of points, wherein the optimal cluster count is equal to a number of clusters associated with a maximum point of the curve.

13. A non-transitory computer readable storage medium that stores instructions that, when executed by one or more processors of a computing system, cause the computing system to:
determine incremental values associated with a plurality of clustering solutions, wherein each of the clustering solutions groups stores of a retailer into clusters in a different way, wherein for each clustering solution in the plurality of clustering solutions, the incremental value associated with the clustering solution indicates a difference between an estimated revenue associated with the clustering solution and revenue associated with a baseline clustering solution, and as part of causing the computing system to determine the incremental values associated with the plurality of clustering solutions, the instructions cause the computing system to, for each respective clustering solution from the plurality of clustering solutions:
determine incremental values associated with each of the clusters into which the respective clustering solution groups the stores, wherein the incremental value associated with each of the clusters into which the respective clustering solution groups the stores is an aggregation of incremental values associated with the stores in the cluster, and the incremental value associated with each store in the cluster is an estimated change in a revenue of the store if a current assortment of items in the store is swapped with another assortment of items; and
determine the incremental value associated with the respective clustering solution based on a sum of the incremental values associated with each of the clusters into which the respective clustering solution groups the stores;
determine, based on a comparison of incremental values associated with the plurality of clustering solutions, an appropriate number of clusters such that the appropriate number of clusters corresponds to a turning point of a best fit curve through a plurality of points, each respective point of the plurality of points corresponding to a respective clustering solution of the plurality of clustering solutions, the respective point having a first coordinate corresponding to a number of clusters associated with the respective clustering solution and a second coordinate corresponding to the incremental value associated with the respective clustering solution; and
select, based at least on part on the appropriate number of clusters, a particular clustering solution in the plurality of clustering solutions, wherein merchandise is distributed to the stores based at least in part on the particular clustering solution.

14. The non-transitory computer readable storage medium of claim 13, wherein the instructions, when executed by the one or more processors, cause the computing system to determine the best fit curve based on a polynomial regression over the plurality of points, wherein the appropriate number of clusters is equal to a number of clusters associated with a maximum point of the curve.

* * * * *